Sept. 29, 1959 D. H. PUTNEY 2,906,796
COMBINATION PROCESS OF EFFLUENT REFRIGERATION
AND CLOSED CYCLE REFRIGERATION
Filed May 23, 1956 2 Sheets-Sheet 1

INVENTOR.
David H. Putney
BY
ATTORNEY

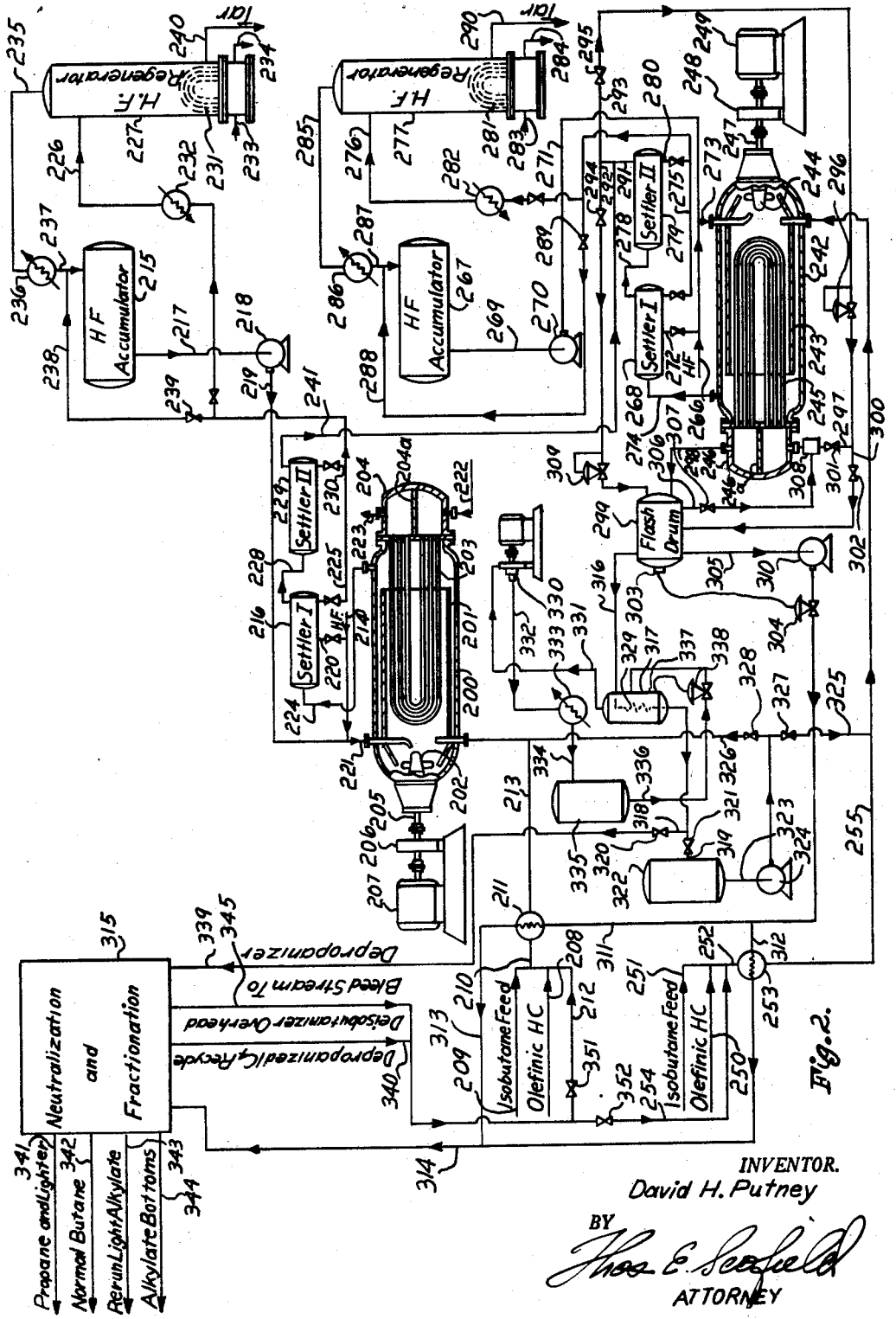

United States Patent Office

2,906,796
Patented Sept. 29, 1959

2,906,796

COMBINATION PROCESS OF EFFLUENT REFRIGERATION AND CLOSED CYCLE REFRIGERATION

David H. Putney, Kansas City, Kans., assignor to Stratford Engineering Corporation, Kansas City, Mo., a corporation of Delaware Application May 23, 1956, Serial No. 586,726

6 Claims. (Cl. 260—683.48)

This invention relates to effluent refrigeration and refers more particularly to a method of achieving the benefits of effluent refrigeration for at least one first chemical reaction system not employing effluent refrigeration in the reaction step which is communicable with at least one second, like chemical reaction system which does employ effluent refrigeration in its reaction step, said method also benefitting the effluent refrigeration process in said chemical reaction system.

Effluent refrigeration shall mean any system of refrigeration used in a reaction system which employs as a refrigerating medium any part or all of the effluent issuing from a reactor or settler for cooling the reaction zone, wherein the reactor and settler are maintained at a pressure sufficient to prevent vaporization therein and the pressure on the effluent is subsequently reduced in the refrigeration cycle, and wherein vapors evolved from the effluent in the refrigeration cycle are condensed and returned as part of the feed to the reactor.

The invention is viewed as applicable to any chemical reaction system wherein the reactants are contacted in a reaction step, one of the reactants is in excess and capable of being evaporated with pressure reduction and wherein it is desirable to cool the reaction step.

As a specific example, the invention will be presented as applied in alkylation systems wherein isobutane and olefins are contacted with liquid acid catalyst (such as and including hydrofluoric and sulfuric acid) and a mixture of hydrocarbons is withdrawn with acid catalyst as effluent from the reaction step, but chemical reaction systems employing other reactants, other catalysts or no catalysts, etc., which have the above listed characteristics are contemplated as being able to benefit by and be included within the invention. Some other chemical reaction systems to which the instant invention is applicable in either general or limited form include the production of ethyl benzene for styrene manufacture by condensation of benzene with ethylene or ethyl chloride using a catalyst such as aluminum chloride and benzene as excess reactant material, hydrocarbon reaction systems in which aluminum bromide might be used as a catalyst (aluminum bromide being quite soluble in hydrocarbons) and reaction systems employing boron trifluoride as a catalyst (the latter being a gas and corrosive). In one of its limited forms, the invention would also be applicable to any chemical reaction employing effluent refrigeration in which a harmful or deleterious material is found in the effluent reaction mixture (volatile, sticking, corrosive, etc.).

Therefore, an object of the present invention is to provide a method of gaining at least some of the benefits of effluent refrigeration for a first chemical reaction system wherein the reactants are contacted in a reaction step, one of the reactants is in excess and capable of being evaporated with pressure reduction and it is desirable to cool the reaction step, said first system not employing effluent refrigeration, but which is within communicating distance of a second chemical reaction system of like character employing effluent refrigeration.

Another object of the present invention is to provide such a method which may improve the benefits of effluent refrigeration in the second chemical reaction system.

Another object of the invention is to obtain indirect heat exchange of the input of reactants to both such chemical reaction systems rather than merely the single reaction system already employing effluent refrigeration.

Another object of the invention is to increase the recycle of unreacted reactant in the first chemical reaction system, as is already the case in the effluent refrigeration system.

Another object of the invention is to provide an integrated effluent refrigeration system which at least in part embraces both the original and second chemical reaction systems wherein the heat exchanging of the reactant feeds and the recycle unreacted reactant feeds can be regulated between the two systems as desired.

Another object of the invention is to provide such an integrated effluent refrigeration system which embraces at least in part both reaction systems whereby the required capacity of the refrigeration system employed in the original reaction system may be reduced if desired while maintaining the same or lower reaction temperature.

Another object of the invention is to provide a greater circulation of liquid phase effluent reaction mixture through the reactor cooling elements of the second chemical reaction system when only such liquid phase effluent refrigeration is employed.

Another object of the invention is to provide a greater quantity of liquid and vapor phase reaction mixture volume through the reactor cooling elements of the adjacent systems reaction step when such total circulation is employed.

Another object of the invention is to provide a greater quantity of liquid eduction into the reactor cooling elements of the adjacent reaction step when such eduction is employed in the system.

Another object of the invention is to provide means permitting recycle of excess unreacted reactant to both reaction steps even in systems employing objectionable catalytic materials or impurities which are carried over into the unreacted excess reactant.

Another object of the invention is to reduce the deisobutanizer load on the original reaction step where the chemical reactions are the alkylation of isobutanes with olefins with acid catalyst.

Another object of the present invention is to operate two alkylation units in combination, one with closed cycle refrigeration and the other with effluent refrigeration so that for a given total amount of isobutane a lower acid consumption and a higher quality product will be realized than when each of the units is operated separately without benefit of the combination.

Other and further objects of the invention will appear in the course of the following description thereof:

In the drawings, which form a part of the instant specification and are to be read in conjunction therewith, there are shown two embodiments of the invention.

Fig. 2 is a schematic flow diagram of a second embodiment of the invention wherein isobutane and olefins are contacted with liquid hydrofluoric acid catalyst in an alkylation system.

"Sulfuric" acid system (Fig. 1)

Figure 1:
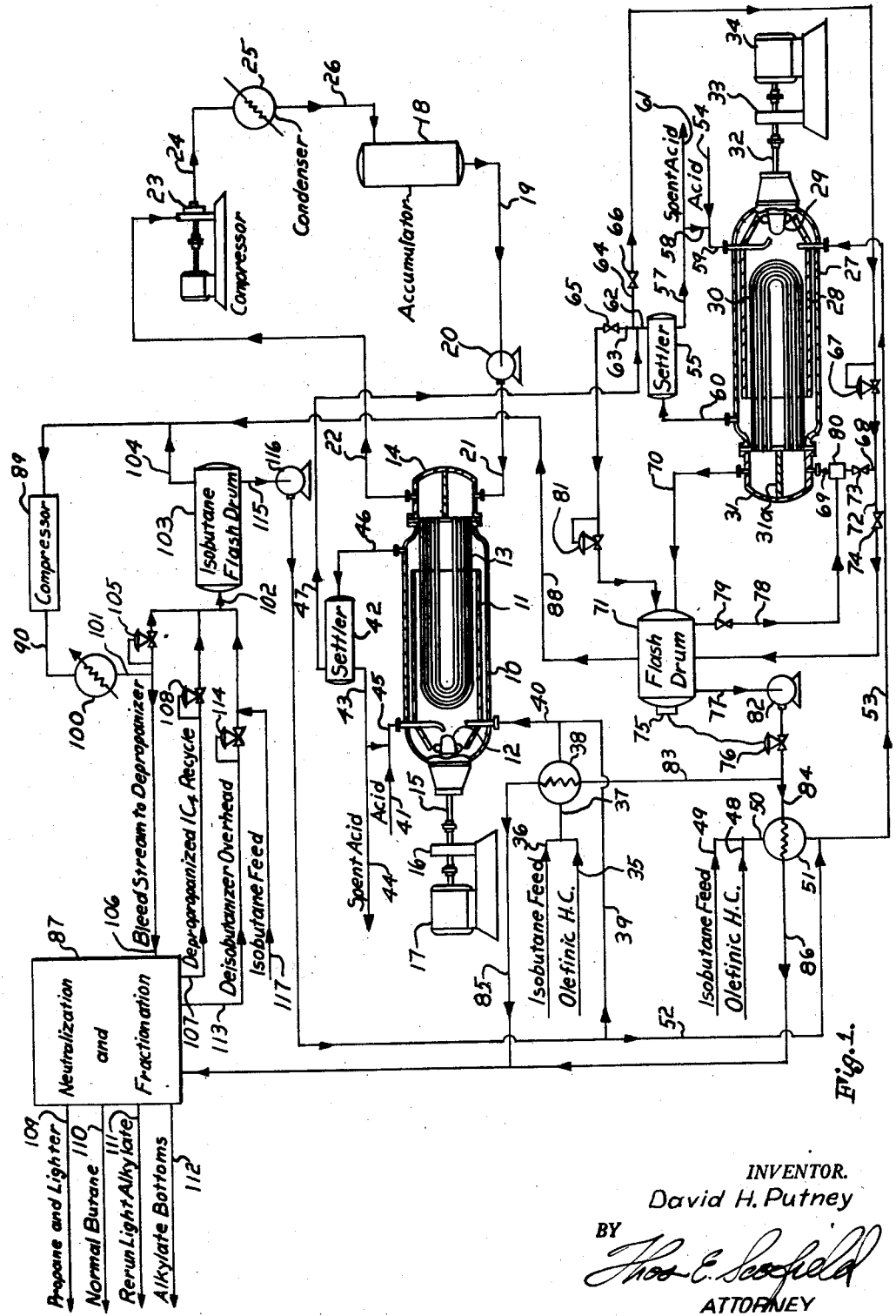
Fig. 1 is a schematic flow diagram of one embodiment of the invention, said embodiment being particularly adapted to chemical reaction systems wherein isobutane and olefins are contacted with liquid sulfuric acid in an alkylation system.

Referring to the drawings, and more particularly to Fig. 1, at 10 is shown the shell of a reactor or contacting vessel equipped with an open ended circulating tube 11. At one end of the circulating tube is an impeller 12 which serves the purpose of a circulating pump in cooperation with the circulating tube. Within the circulating tube 11 are a plurality of heat exchange elements 13 comprising a tube bundle provided with a distributing head 14 enclosing one end of the reactor. The impeller 12 is mounted on a shaft 15 rotated through a reduction gear 16 by any suitable source of power or prime mover such as an electric motor or steam turbine diagrammatically shown at 17.

Circulation of heat exchanging fluid such as ammonia or propane through the tube bundle or heat exchange elements is accomplished by any conventional heat exchange unit such as the conventional closed cycle refrigeration unit illustrated. In this unit, fluid from the condensate accumulator 18 is fed through flow line 19 by pump 20 (optional) and line 21 into the distributing head 14 through the tube bundle 13 and out of the distributing head 14 through flow line 22 to a compressor 23 then through flow line 24 to a condensation step diagrammatically shown at 25 and through flow line 26 into the condensate accumulator 18. Such closed cycle refrigeration units are well known in the art and any conventional variation thereon may be employed.

Circulation within the reactor is established by the impeller 12 through the annular space between the shell 10 and the circulating tube 11 around the cooling or heat exchanging tubes 13 and back to the impeller. Alkylation of the isoparaffinic hydrocarbons by the olefinic hydrocarbons takes place in the reactor while the mixture is being rapidly circulated and agitated by impeller 12 which assures mixing of the hydrocarbons and acid catalyst.

Referring now to the lower right-hand side of Fig. 1, a second reactor similar in its construction to that of the first reactor just described, is shown schematically. This reactor, in commercial practice, must be positioned so as to be communicable with said first reactor. Referring now to this second reactor, at 27 is shown the shell of the second reactor equipped also with an open ended circulating tube 28. At one end of the circulating tube is an impeller 29 which serves the purpose of a circulating pump in cooperation with the circulating tube. Within the circulating tube 28 are a plurality of heat exchange elements 30 comprising a tube bundle provided with a distributing head 31 enclosing one end of the reactor. The impeller 29 is mounted on a shaft 32 rotated through a reduction gear 33 by any suitable source of power or prime mover such as an electric motor or steam turbine diagrammatically shown at 34.

The flow of fluid through the tube bundle 30 or heat exchange elements will be later described. Circulation within the reactor is established by the impeller 29 through the annular space between the shell 27 and circulating tube 28 around the cooling or heat exchange tubes 30 and back to the impeller. Alkylation of the isoparaffinic hydrocarbons by the olefinic hydrocarbons takes place in the reactor while the mixture is being rapidly circulated and agitated by impeller 29 which assures mixing of the hydrocarbons and acid catalyst.

It is contemplated in the case of each of the reactors 10 and 27 shown, that the two separate chemical reactions may be carried out at least partially in vessels without heat exchange tubes. In such case the heat exchange operations relative each separate chemical reaction to reduce the temperature of the exothermic reaction would be accomplished in a later stage, but, in both instances illustrated, the apparatus shown, with built-in heat exchange elements in the reactor itself, is preferred.

Referring back to the first reactor in the center of Fig. 1, to simplify an understanding of the process relative said first reactor, it will be described in conjunction with the apparatus. Olefinic hydrocarbons and isobutane are introduced to the system through lines 35 and 36, respectively, and are combined in feed pipe 37 prior to passage through heat exchanger 38. Recycled isobutane returned through pipe 39 is introduced into the hydrocarbon mixture on the downstream side of heat exchanger 38, constituting the feed by introduction into pipe 40. Fresh acid is fed to the first reactor through line 41 and recycle acid from settler 42 is combined with the fresh acid through pipe 43 or diverted from the system through pipe 44.

The hydrocarbons supplied through lines 35 and 36 are mixed with recycled isobutane added through line 39 and then mixed in the first reactor with the acid catalyst introduced through lines 41, 43 and 45. As previously mentioned, alkylation of the isoparaffinic hydrocarbons by the olefinic hydrocarbons takes place in the reactor while the mixture is being rapidly circulated and agitated by impeller 12 which assures a thorough and intimate dispersion of the hydrocarbon and acid catalyst.

The effluent mixture of hydrocarbons and acid is discharged from the reactor through pipe 46, passing to the acid settler 42 where it is permitted to separate into a hydrocarbon phase and an acid phase. The acid phase is withdrawn from the bottom of the settler and directed to the reactor through pipes 43 and 45 while a portion of the acid separated in the settler may be diverted through the spent acid discharge line 44 to maintain a proper acidity and proportioning of reactants and catalyst in the system.

If the chemical reaction which is conducted in the first reactor is such that the catalyst need not or cannot readily be separated from the reactants or is one employing no catalyst, the separation step may be omitted. An example of such a process would be the alkylation of isobutane with ethylene using an aluminum bromide catalyst which is soluble in the hydrocarbons.

The hydrocarbon phase separated in the settler 42 is discharged from the top through pipe 47 and this hydrocarbon phase material is run to the vicinity of the second reactor 27 and entered into the effluent hydrocarbon phase material in said second reactor system in a manner to be described after the reaction system of the second reactor 27 is set forth. Both the reactor 10 and settler 42 are operated at pressure sufficiently high to prevent vaporization therein. This pressure is maintained by back pressure regulating valves 67 or 81 as hereinafter described.

Referring now to the second reactor system shown in the lower right hand corner of Fig. 1, olefinic hydrocarbons and isobutane in excess are introduced to the system through lines 48 and 49, respectively, and are combined in feed pipe 50 prior to passage through heat exchanger 51. Recycled isobutane from fractionation is returned through pipe 52 and introduced into the hydrocarbon mixture on the downstream side of heat exchanger 51, constituting a portion of the feed supplied to the second reactor 27 through pipe 53.

Fresh acid is supplied to the system through line 54, being combined with recycle acid from settler 55. The acid phase from settler 55 is returned to the reactor 27 through lines 57 and 58. The fresh acid and recycle acid enter the second reactor through pipe 59.

Hydrocarbons supplied through lines 48 and 49 combined with recycled isobutane are mixed in the reactor with the acid catalyst introduced through pipe 59. As previously mentioned, alkylation of the isoparaffinic hydrocarbons by the olefinic hydrocarbons takes place in the reactor while the mixture is being rapidly circulated and agitated by impeller 29 which assures mixing of the hydrocarbons and acid catalyst.

The effluent mixture of hydrocarbons and acid is discharged from the second reactor through pipe 60, passing to the acid settler 55 where it is permitted to separate into a hydrocarbon phase and an acid phase. If the reaction is such that the catalyst need not or cannot be readily separated from the reactants or is one employing no catalyst, the separation step may be omitted. An example of such a process would be the alkylation of isobutane with ethylene as set forth above relative the first reactor, using an aluminum bromide catalyst which is soluble in the hydrocarbons. The acid phase is withdrawn from the bottom of the settler and directed to the reactor through pipes 57 and 58 while a portion of the acid separated in the settler may be diverted through the spent acid discharge line 61 to maintain a proper acidity and proportioning of reactants and catalyst in the system. Both the reactor 27 and settler 55 are operated at pressure sufficiently high to prevent vaporization therein. This pressure is maintained by back pressure regulating valves 67 or 81 as hereinafter described.

The hydrocarbon phase separated in the settler 55 is discharged from the top through pipe 62 and joined by the hydrocarbon phase material from the first reactor through pipe 47. The combined hydrocarbon phase material may then be directed either through line 63 or line 64 by manipulation of the valves 65 and 66 in these lines. If directed through line 64, pressure is reduced at pressure reduction valve 67 resulting in vaporization of a portion of the isobutane component and chilling of the material, after which at least a portion and preferably most of all the liquid-vapor mixture, at greatly increased velocity, is directed through lines 68 and 69 to the distributing head 31 of the reactor. This distributing head is divided by a partition 31a which causes the coolant introduced through lines 68 and 69 to pass through the heat exchange elements 30, thence into the opposite side of the distributing head and out through the pipe 70. Back pressure valve 67 is designed to hold sufficient back pressure on the reactor-settler system to prevent appreciable evaporation of the hydrocarbon components contained therein. If desired, a portion of the reduced pressure hydrocarbon phase material may be passed directly to the flash drum 71 by line 72. Valves 73 and 74 regulate the relative amounts of this flow.

For example, when alkylating isobutane with butylenes in a system wherein a small amount of propane is also present, the reaction temperature will normally be controlled at 33° F. to 55° F. and the back pressure maintained on the settler by valve 67 will be in the order of 40 p.s.i.g. to 100 p.s.i.g. Upon passing pressure reduction valve 67, pressure upon the hydrocarbon effluent is reduced to the order of 0 p.s.i.g. to 10 p.s.i.g., causing a considerable portion of the lighter components of the effluent to vaporize resulting in the cooling of the entire hydrocarbon effluent mixture. Depending upon the pressure established within the cooling elements or tube bundle of the reactor, the temperature of the hydrocarbon effluent phase will be reduced to a figure normally within the range of 15° F. to 30° F. by evaporative cooling, making it suitable for use as the cooling medium for the reactor.

Upon leaving the cooling elements 30 of the reactor, the chilled and partially vaporized effluent passes from the opposite side of the distributing head 31 through line 70 to effluent flash drum 71 where the vapor and liquid portions of the effluent are separated. A liquid level control 75 manipulating valve 76 regulates the discharge of liquid from the effluent flash drum 71 through pipe 77. A second draw-off pipe 78, controlled by valve 79 connects into pipe 69 at an eductor 80. The function of the eductor is to utilize the energy of the high velocity stream of fluid passing through line 68 after pressure reduction at valve 67. This stream of hydrocarbons flowing at high velocity draws into pipe 69 liquid from the flash drum 71 through pipe 78.

Hydrocarbon phase may be directed through line 63 from the acid settler, pressure reduced at valve 81 and the material chilled by evaporative cooling in flash drum 71. In such a case, only the liquid portion of the hydrocarbon phase is returned from the flash drum 71 as the cooling medium to the reactor. Circulation of liquid through the cooling tubes in such case is effected by the gas lift effect of the vapors evolved within the tubes. It is contemplated as well that the hydrocarbon phase discharged through line 62 and combined with the first reactor hydrocarbon phase, that is, the combination flow, may be split and a portion passed through line 64 and the remainder through line 63. Valves 66 and 65 control the relative amounts of these flows if such is the case.

Liquid withdrawn from the effluent flash drum through pipe 77 is returned by pump 82 and pipes 83 and 84 to heat exchangers 38 and 51 where it is brought in heat exchanging relationship with the incoming feed stocks supplied through pipes 37 and 50, respectively. From the heat exchangers 38 and 51, the liquid passes thence through lines 85 to 86 to the neutralization and fractionating steps diagrammatically shown at 87.

The vapors separated from the hydrocarbon effluent in the flash drum or suction trap 71 pass off from the top through line 88 to compressor 89 from which they are discharged through line 90 to condenser 100. A portion of the condensate from condenser 100 is diverted through lines 101 and 102 to isobutane flash drum 103 operated at the same pressure as flash drum 71 since both pressures are controlled by the suction pressure on compressor 89 and have an open communicating line 104. Interposed in line 101 is a pressure reducing valve 105 which holds sufficient back pressure on the condenser 100 to make possible substantially total condensation of the hydrocarbons at the temperature which can be maintained with the available water supply. Pressure upon the liquid hydrocarbons passing through valve 105 is reduced, causing partial vaporization and chilling prior to their introduction into flash drum 103.

When propane is a component of any of the feed streams, a portion of the condensate withdrawn through line 101 is diverted through pipe 106 to the depropanizer of fractionation diagrammatically shown at 87. This is necessary in order to purge the system of the same amount of propane as is contained in the feed stock, and, after depropanization, this stream is returned to the system through line 107, pressure reducing valve 108 and pipes 102 to the isobutane flash drum. Back pressure valve 108 in line 107 functions in the same manner as reducing valve 105 previously described. It will be understood, of course, that if less build-up of propane is desired in the reactor system, all of the condensate from condenser 100 may be passed to the depropanizer through line 106 and returned to the system after depropanization through line 107. In such case none of the condensate would pass through pressure reducing valve 105.

Liquid hydrocarbons withdrawn from suction trap or flash drum 71 through pipe 77 are pumped, as previously explained, through pipes 83 and 85, 84 and 86 to fractionation and there separated into streams of propane, isobutane, normal butane, light alkylate and alkylate bottoms. In some operations utilizing effluent refrigeration, the alkylate bottoms are eliminated, or alkylate of about 380° F.E.P. (Fahrenheit end point) entirely suitable for motor fuel is obtained without any fractionation of the alkylate. When the alkylate is fractionated to recover a fraction of lower end point suitable for use in aviation gasoline of current specifications, the bottoms fraction is suitable for motor fuel. The product streams are normally removed from the system through pipes 109, 110, 111 and 112. The isobutane stream taken overhead from the deisobutanizer tower is recycled either through lines 36 and 49 or through pipe 113, pressure reduction valve 114 and pipe 102 to the isobutane flash drum from which it is returned to the reaction stage through pipe 115, pump 116 and pipes 39 and 52 to the first and second reactors, respectively. Fresh isobutane feed to the two systems may also be brought in either through lines 36 and 49 or through pipe 117 which connects through line 102 with the isobutane flash drum 103. All of the streams entering this isobutane flash drum 103 are subjected to reduced pressure established by the suction of the compressor and are thereby self-refrigerated. The vapors evolved in the isobutane flash drum by this evaporative cooling are passed through line 104 to the compressor 89 while the chilled liquid from the drum, principally isobutane, is returned to the two reactors as described.

In actual practice, it has been found that when the pressure on the hydrocarbon phase both withdrawn from the settler 55 and added through line 47 is reduced and the material thereafter separated in an evaporative cooler (passed through line 63 directly to the flash drum), any pump (not shown) used to recycle the liquid as a coolant to the second reactor must be of considerable capacity in order to provide sufficient velocity through the cooling elements to effect a high rate of heat transfer. To drive such a pump necessitates considerable horsepower, which is expensive. Again, when none of the liquid from the flash drum 71 is passed through the heat exchanger in the reactor and only the combined hydrocarbon effluent from line 64 is used, there is a relatively large volume of vapor and a limited amount of liquid passing through the cooling elements. Under these conditions it is sometimes difficult to keep the internal surface of the cooling elements covered with liquid, which greatly reduces the effectiveness or cooling effect of the coolant. As stated previously, it has been found that both of these objections can be eliminated by causing circulation through the cooling elements of both the combined hydrocarbon effluents of the two reactors separated in the settlers 42 and 55 after pressure reduction at valve 67, together with additional liquid withdrawn from the suction trap through line 78. By operating with both liquid and vapor passing over the cooling tubes 30 of the second reactor 27 without prior separation, less turbulence and less carryover from the flash drum 71 is experienced. By operation it would seem likely and would normally be predicted that there would be a build-up of pressure which would force the liquid and vapor from the pressure reducing valve 67 up into the suction trap, especially if there were a low level or the liquid seal were broken. However, with the eductor 80 placed as explained, it actually works as desired with both liquid and vapor first passing to the cooling coils 30 of the second reactor 27, thence to the suction trap 71, even if the charge pump 82 to the debutanizer or deisobutanizer should take off too much liquid from the suction trap 71 so as to break the liquid seal.

Regardless of the means used for effecting flow of coolant through the cooling elements of the reactor, the pressure of the hydrocarbon fluid leaving the acid settlers 42 and 55 must be reduced from settler pressure to suction trap or flash drum 71 pressure at some point. When this pressure is released, a considerable portion of the lighter components of the hydrocarbon effluent, primarily isobutane, is vaporized and a chilling effect takes place which reduces the temperature of the hydrocarbons to about 15° F. to 30° F. Considerable energy is expended across the valve 67 in which this pressure reduction takes place, and although the velocity in the line upstream of the valve may be in the order of two feet to ten feet per second, the velocity downstream after vaporizing an appreciable portion of the hydrocarbons usually exceeds one hnudred feet per second. The energy in this high velocity stream flowing through pipes 68 and 69 can well be utilized to increase circulation through the heat exchange elements in the reactor by introducing the stream into the liquid recycle line 78 from the flash drum 71 in such a manner that the high velocity stream will produce an inductive effect on the liquid from the suction trap or flash drum 71. This is accomplished as described either by extending line 68 carrying the high velocity stream into an elbow in the liquid circulating line 78 as shown, or it can be accomplished by installing a conventional type eductor 80 in the liquid line from the flash drum 71 and introducing the chilled effluent from line 68 into the high pressure connection of the eductor so it serves as the energizing medium therein.

Although the invention has been described as applying to alkylation in which sulfuric acid is used as a catalyst, it is applicable as well to alkylation using hydrofluoric acid as the catalytic agent. Another process for which the invention is applicable is the production of ethyl benzene for styrene manufacture by condensation of benzene with ethylene or ethyl chloride using a catalyst such as aluminum chloride and benzene as excess reactant material.

*Hydrofluoric acid system* (Fig. 2)

Referring now to Fig. 2, and the primary reactor in the center of the figure, at 200 is shown the shell of the primary reactor equipped with an open ended circulation tube 201. At one end of the circulation tube is an impeller 202 which serves the purpose of a circulating pump in co-operation with the circulation tube. Within the circulation tube 201 are a plurality of heat exchange elements 203 comprising a tube bundle provided with a distributing head 204 enclosing one end of the reactor. The impeller 202 is mounted on a shaft 205 rotated through a reduction gear 206 by any suitable source of power or prime mover such as an electric motor or steam turbine diagrammatically shown at 207. Circulation within the reactor is established by the impeller within the annular space between the shell 200 and circulation tube 201 around the cooling or heating exchange tubes 203 and back to the impeller. Olefinic hydrocarbons and isobutane in excess are introduced to the system through lines 208 and 209, respectively, and are combined in feed pipe 210 prior to passage through heat exchanger 211. Recycled isobutane from fractionation is returned through pipe 212 and introduced into the hydrocarbon mixture before reaching the heat exchanger 211, constituting a portion of the feed supplied to the reactor through pipe 213.

Fresh acid is supplied to the system through line 214, being combined with recycle acid from accumulator 215 and recycle acid from primary acid settler 216. The regenerated recycle acid is returned through line 217, pump 218 and line 219 while the recycle acid from primary acid settler 216 is returned to the reactor through line 220. The fresh acid, regenreated acid, and recycle acid enter the reactor through pipe 221.

Hydrocarbons supplied through lines 208 and 209 combined with recycled isobutane are mixed in the reactor with the acid catalyst introduced through pipe 221. Alkylation of the isoparaffinic hydrocarbons by the olefinic hydrocarbons takes place in the reactor while the mixture is being rapidly circulated and agitated by impeller 202 which assures mixing of the hydrocarbons and acid catalyst.

Cooling medium is directed through line 222 to the distributing head 204 of the reactor. This distributing head is divided by a partition 204a which causes the coolant introduced through line 222 to pass through the heat exchange elements 203, thence into the opposite side of the distributing head and out through the pipe 223. Any conventional cooling system such as a closed cycle cooling system employing Freon, propane or ammonia such as is shown in Fig. 1 may be employed. Cooling water lines may be employed to run water through the heat exchange elements as the heat exchanging medium.

The effluent mixture of hydrocarbons and acid is discharged from the reactor through pipe 224, passing first to the primary acid settler 216 where it is permitted to separate into a hydrocarbon phase and an acid phase. The acid phase is withdrawn from the bottom and is either returned to the reactor through pipes 220 and 221 or diverted through pipes 225 and 226 to the acid regenerator 227. Valves are interposed in these lines to govern the amount of acid returned to the reactor and diverted to the regenerator.

The hydrocarbon phase separated in primary settler 216 is discharged from the top through pipe 228 into final acid settler 229. In the final settler, the effluent mixture of hydrocarbons is permitted to separate from whatever acid remains, approximately one percent by weight remaining in the hydrocarbon phase material, the acid bottoms being withdrawn through a discharge line 230 connected into the acid discharge pipe 225 through which the acid bottoms from settlers 216 and 229 pass through lines 225 and 226 to acid regenerator 227 which is equipped with heating coil 231. A preheater 232 is interposed in pipe 226 ahead of the regenerator. Input and discharge fluid lines 233 and 234 serve to circulate a heating medium through coil 231 in the bottom of the acid regenerator 227. Regenerated acid passes from the top of the regenerator 227 through line 235, and after condensation at 236 is delivered through pipe 237 into acid accumulator 215. By-pass flow line 238, controlled by valve 239, may be used to by-pass the regenerator 227 or divert a portion of the acid bottoms from the settlers 216 and 229 to accumulator 215. As previously suggested, acid from the accumulator 215 is returned through lines 217 and 219 to the reactor. Sludge and tars are removed from the bottom of the regenerator 227 through line 240 to suitable disposal.

The hydrocarbon phase separated in the final acid settler 229 is discharged from the top through pipe 241 and directed to the hydrocarbon phase discharge line on the second settler of the second reactor. This second reactor system will now be described and the employment of the hydrocarbon phase material from the first reactor system therewith.

Referring now to the lower right-hand side of Fig. 2, at 242 is shown the shell of a reactor equipped with an open ended circulating tube 243. At one end of the circulating tube is an impeller 244 which serves the purpose of a circulating pump in cooperation with a circulating tube. Within the circulating tube 243 are a plurality of heat exchange elements 245 comprising a tube bundle provided with a distributing head 246 enclosing one end of the reactor. The impeller 244 is mounted on a shaft 247 rotated through a reduction gear 248 by any suitable source of power or prime mover such as an electric motor or steam turbine diagrammatically shown at 249.

Olefinic hydrocarbons and isobutane in excess are introduced to the system through lines 250 and 251, respectively, and are combined in feed pipe 252 prior to passage through heat exchanger 253. Recycled isobutane from fractionation is returned through pipe 254 and introduced into the hydrocarbon mixture before reaching the heat exchanger 253, constituting a portion of the feed supplied to the reactor through pipe 255.

Fresh acid is supplied to the system through line 266, being combined with regenerated acid from accumulator 267 and recycle acid from primary acid settler 268. The regenerated acid is returned from the accumulator 267 through line 269, pump 270 and line 271 while the recycle acid from primary settler 268 is returned to the reactor through line 272. The fresh acid, regenerated acid and recycle acid enter the reactor through pipe 273.

Hydrocarbons supplied through lines 250 and 251 combined with recycled isobutane are mixed in the reactor with the acid catalyst introduced through pipe 273. Alkylation of the isoparaffinic hydrocarbons by the olefinic hydrocarbons takes place in the reactor while the mixture is being rapidly circulated and agitated by impeller 244 which assures mixing of the hydrocarbons and acid catalyst.

The effluent mixture of hydrocarbons and acid is discharged from the reactor through pipe 274, passing first to the primary acid settler 268 where it is permitted to separate into a hydrocarbon phase and an acid phase. The acid phase is withdrawn from the bottom and is either returned to the reactor through pipes 272 and 273 or diverted through pipes 275 and 276 to the acid regenerator 277. Valves are interposed in these lines to govern the amount of acid returned to the reactor 242 and diverted to the regenerator 277.

The hydrocarbon phase separated in primary settler 268 is discharged from the top through pipe 278 into final acid settler 279. In the final settler, the effluent mixture of hydrocarbons is permitted to separate from whatever acid remains, approximately one percent by weight remaining in the hydrocarbon phase material, the acid bottoms being withdrawn through a discharge line 280 connected into the acid discharge pipe 275 through which the acid bottoms from the primary acid settler flow to the acid regenerator 277. The acid bottoms from settlers 268 and 279 pass through lines 275 and 276 to acid regenerator 277 which is equipped with heating coil 281. A preheater 282 is interposed in pipe 276 ahead of the regenerator. Input and discharge fluid lines 283 and 284 serve to circulate a heating medium through coil 281 in the bottom of the acid regenerator 277. Regenerated acid passes from the top of regenerator 277 through line 285, and after condensation at 286 is delivered through pipe 287 into acid accumulator 267. By-pass flow line 288, controlled by valve 289 may be used to by-pass the regenerator 277 or divert a portion of the acid bottoms from the settlers 268 and 279 to accumulator 267. As previously suggested, acid from the accumulator 267 is returned through lines 269 and 271 to the reactor. Sludge and tars are removed from the bottom of the regenerator through line 290 to suitable disposal.

The hydrocarbon phase separated in the final acid settler 279 is discharged from the top through pipe 291 joined by the hydrocarbon phase from top of the second settler 229 of the first reactor 200 brought therefrom through pipe 241 and the combined streams may be directed either through lines 292 or 293 by manipulation of the valves 294 and 295 in these lines. If directed through line 293, pressure is reduced at pressure reduction valve 296 resulting in vaporization of a portion of the isobutane component and chilling of the material, after which at least a portion and preferably most or all of the liquid-vapor mixture at greatly increased velocity is directed through line 297 to the distributing head 246 of the reactor. This distributing head is divided by a partition 246a which causes the coolant introduced through line 297 to pass through the heat exchange elements 245, thence into the opposite side of the distributing head and out through the pipe 298. Back pressure valve 296 is designed to hold sufficient back pressure on the reactor-settler system to prevent appreciable evaporation of the hydrocarbon components contained therein. If desired, a portion of the reduced pressure hydrocarbon phase material from valve 296 may be passed directly to the flash drum 299 by line 300. Valves 301 and 302 in lines 297 and 300 regulate the relative amounts of this flow.

In a system wherein a small amount of propane is present and the reaction temperature is controlled at about 33° F. to 55° F., the back pressure maintained on the settler 279 by valve 296 will be in the order of 40 p.s.i.g. to 100 p.s.i.g. Upon passing pressure reduction valve 296 pressure upon the hydrocarbons passing into the cooling elements 245 is reduced to the order of 0 p.s.i.g. to 10 p.s.i.g., causing a considerable portion of the lighter components of the effluent to vaporize, resulting in the cooling of the entire combined hydrocarbon phases from the reactors 200 and 242. Depending upon the pressure established within the cooling elements of the tube bundle 245 of the reactor 242, the temperature of the hydrocarbon effluent phase will be reduced to a figure normally within the range of 15° F. to 30° F. by evaporative cooling, making it suitable for use as the cooling medium for the reactor 242.

Upon leaving the cooling elements 245 of the reactor 242, the chilled and partially vaporized effluent passes from the opposite side of the distributing head 246 through line 298 to effluent flash drum 299 where the vapor and liquid portions of the effluent are separated. A liquid level control 303 manipulating valve 304 regulates the discharge of liquid from the effluent flash drum 299 through pipe 305. A second draw-off pipe 306 controlled by valve 307 connects into pipe 297 at an eductor 308. The function of the eductor is to utilize the energy of the high velocity stream of fluid passing through line 297 after pressure reduction at valve 296. This stream of hydrocarbons flowing at high velocity draws into pipe 297 liquid from the flash drum 299 through pipe 306.

The combined hydrocarbon phase material from reactors 200 and 242 may as well be directed through line 292 from the final acid settler 279, pressure reduced at valve 309 and the material chilled by evaporative cooling a flash drum 299. In such a situation, only the liquid portion of the hydrocarbon phase is returned as the cooling medium to the reactor 242 from the flash drum 299. Circulation of liquid through the cooling tubes in such case is effected by the gas lift effect of the vapors evolved within the tubes. It is contemplated as well that the hydrocarbon phase discharged from settler 279 through line 291 and combined with the hydrocarbons in line 241 from the first reactor system, that is, the totality, may be split and a portion of the combination passed through line 293 and the remainder through line 292. Valves 295 and 294 control the relative amounts of these flows in such an instance.

The liquid withdrawn from the effluent flash drum 299 through pipe 305 is returned by pump 310 and pipes 311 and 312 to heat exchangers 211 and 253 where it is brought in heat exchanging relationship with the incoming feed stocks in the two separate reactor systems supplied through pipes 210 and 252, respectively. From the heat exchangers 211 and 253, the liquid passes through lines 313 and 314 to neutralization and fractionation schematically shown at 315.

The vapors separated from the hydrocarbon effluent in the flash drum 299 pass off through line 316 to condenser 317 from which the condensate may be split between two lines 318 and 319 regulated through valves 320 and 321, line 319 leading to effluent flash accumulator 322 and line 318 leading to neutralization and fractionation steps to be later described. The effluent flash drum 299 is operated at a pressure in the order of 15 to 25 p.s.i.a. when the reactor is held at 50° F. The vapors leaving the flash drum 299 pass to the condenser 317 and to some extent at least, to accumulator 322 which are operated at approximately the same pressure. Condensate in accumulator 322 is recycled to the two reactor feed pipes 255 and 213 through pipes 323, pump 324 and pipes 325 and 326. Valves 327 and 328 regulate the amounts of these flows.

Cooling medium at the condenser 317 is provided by a closed cycle refrigeration system such as, for example, one utilizing Freon 12 or propane. This refrigeration system includes condenser coil 329 in condenser 317, the latter connected to compressor 330 by line 331, a line 332 leading from the compressor 330 to condenser 333 and pipe 334 connecting the condenser to receiver 335. A pipe 336 completes the closed cycle connecting receiver 335 with condenser 317. The condensing surface 329 is kept flooded with liquid refrigerant by level control 337 operating valve 338 which admits liquid refrigerant to condenser 317 from receiver 335. This refrigeration system is operated to provide a condensing temperature in the order of 15° F. It will be noted that the refrigeration system is operated as a closed cycle so that none of the refrigerant comes in contact with the hydrocarbons being processed or the hydrogen fluoride catalyst. Even more important, none of the hydrogen fluoride comes in contact with the compressor 330.

By means of this refrigeration system, effluent vapors are withdrawn from flash drum 299, condensed, and their temperature is reduced commensurate with the temperatures of the circulating refrigerant. Under normal operating conditions, condensate leaving the condenser 317 will have a temperature of approximately 15° to 25° F. The quantity of isobutane in this condensate will normally be in the order of 4 to 7 parts by volume for each part of olefin in the fresh feed to reactor 242. The overhead from hte deisobutanizer (not shown except schematically in the fractionation 315) can thus be reduced by this same amount for any given condition of fixed quality and rerun yield of alkylate, or it follows if the deisobutanizer remains fixed, the concentration of isobutane in the reactor is considerably increased by the condensed vapors from this source, resulting in increased quality and yield of alkylate.

The desirability of recycling liquid from the flash drum 299 through the eductor 308 into the cooling coils of the second reactor system is the same as that described relative Fig. 1 and will not be repeated here.

A portion of the condensate from condenser 317 comprising the condensed vapors separated from the hydrocarbon effluent in the flash drum may be passed through line 318 relative the neutralization and fractionation steps 315 regulated by valve 320.

When propane is a component of any of the feed streams, a portion of the condensate from condenser 317 withdrawn through line 318 is diverted through pipe 339 to the depropanizer of the fractionation section diagrammatically shown at 315. This is necessary in order to purge the system of the same amount of propane as is contained in the feed stock, and after depropanization, this stream is returned to the system through line 340. It will be understood that if less build-up of propane is desired in the reactor system, all of the condensate from condenser 317 taken off through line 318 may be passed to the depropanizer through line 339 and returned to the system after depropanization through line 340.

Liquid hydrocarbons withdrawn from flash drum 299 through pipe 305 are pumped as previously described through pipes 311 and 312, heat exchangers 211 and 253 and pipes 313 and 314 to fractionation 315 and there separated into streams of propane, isobutane, normal butane, light alkylate and alkylate bottoms. In some operations utilizing effluent refrigeration, the alkylate bottoms are eliminated, or alkylate of about 380° F.E.P. (Fahrenheit end point) entirely suitable for motor fuel is obtained without any fractionation of the alkylate. When the alkylate is fractionated to recover a fraction of lower end point suitable for the use in aviation gasoline of current specifications, the bottoms fraction is suitable for motor fuel. The products streams are normally removed from the system through pipes 341, 342, 343 and 344. The isobutane stream taken overhead from the deisobutanizer tower in line 345 is recycled to the reactors through lines 212 and 254 having valves 351 and 352 thereon, respectively, pipes 212 and 254 leading from the valves to the feed lines 210 and 252.

Although the invention has been described in connection with hydrofluoric acid alkylation with reactor temperatures in the order of 50° F., it should be understood that the reactor may be operated at more elevated temperatures since in many cases alkylation units are operated with reactor temperatures of 60–70° F. or even as high as 100° F. In such cases, the effluent flash drum can be operated at higher temperatures and pressures and still provide satisfactory temperature difference between the refrigerating medium and chilled effluent. For the transfer of heat in such cases, the closed cycle refrigeration system can also be operated at higher pressures and still provide satisfactory cooling medium for the flash vapor condenser.

Thus, it is seen that a method has been provided for gaining at least some of the benefits of effluent refrigeration for a first chemical reaction system not employing effluent refrigeration of its reaction step which is within communicating distance of a second chemical reaction system of like character which is employing effluent refrigeration of its reaction step.

The method as shown in both specific examples may improve the benefits in the second chemical reaction system thus, for example, where only liquid phase effluent reaction mixture is circulated through the heat exchange elements of the second chemical reaction system, a greater circulation of such liquid phase material may be achieved in said second chemical reaction system due to the greater amount of liquid phase material in the flash drum or suction trap. Again, in the modification of the method wherein the combined hydrocarbon phase effluent mixtures are both circulated in totality after pressure reduction through the heat exchanging elements of the second reactor, a greater volume of such circulation is possible due to the combination of the effluent hydrocarbon phases from both reactors and thus a more efficient heat exchanging process in the second reactor is possible. Also, where liquid is educted from the flash drum or suction trap into the flow line into the second reactor heat exchanging elements, greater eduction and thus more efficient heat exchange is possible due both to the greater quantity of liquid available in the flash drum and the greater volume of vapor and liquid being circulated through the heat exchanging elements.

The inventive method also has made possible as effluent refrigeration benefits to the first reactor, which does not employ in itself effluent refrigeration, first, indirect heat exchange of the input of reactants to the first reactor or first chemical reaction system, second, an increase in the recycle of unreacted reactant in the first chemical reaction system as is already the case in the second reactor or existing effluent refrigeration system, this latter benefit serving to reduce the deisobutanizer load on the original reaction step where the chemical reactions are the alkylation of isobutanes with olefins with acid catalyst, and, third, permitting the reduction of the required capacity of the original refrigeration system employed in the original system if desired while maintaining the same or lower reaction temperature.

Additionally, the total system benefits from the combination in that an integrated effluent refrigeration system is provided which at least in part embraces both the original and second chemical reaction systems wherein the heat exchanging of the reactant feeds and the recycle of unreacted reactant feeds can be regulated between the two systems as desired as conditions vary relative thereto, these features permitting a much more flexible total system than either system by itself. Finally, the invention has been made applicable even in systems which employ objectionable catalytic materials or impurities which are carried over into the unreacted excess reactant whereby recycle of said excess unreacted reactant to both reaction steps is made possible.

Additionally, by operating two alkylation units in combination, one with closed cycle refrigeration and the other with effluent refrigeration, it is possible for a given total amount of isobutane to realize a lower acid consumption and make a higher quality product than when operating each unit separately without the benefit of the combination.

Thus it will be seen that the invention is well adapted to attain all the ends and objects hereinbefore set forth, together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A method of achieving at least some of the benefits of effluent refrigeration for a first chemical reaction system involving the alkylation of an alkylatable hydrocarbon wherein the reactants are contacted in liquid phase in a reaction step, one of the reactants is in excess, relatively volatile, and capable of being evaporated with pressure reduction, and wherein it is desirable to cool said reaction system and a mixture is withdrawn as effluent from said reaction step, said first chemical reaction system being refrigerated by means other than effluent refrigeration to cool the reaction step, comprising the steps of reacting said first chemical reaction system and a second like chemical reaction system employing effluent refrigeration to cool its reaction step in separate reaction steps, discharging effluent reaction mixtures from said first and second chemical reaction steps, reducing the pressure on said effluent mixtures to vaporize excess reactant in said effluent mixtures, passing at least the major portion of the combined reduced pressure effluent mixtures in indirect heat exchange with the second reaction mixture in its reaction step, passing said heat exchanged effluent mixtures to a separating step, separating said reduced pressure reaction mixtures into liquid and vapor components, and bringing at least a portion of the liquid component separated from said reduced pressure reaction mixtures into indirect heat exchange with the feed of reactants to both said first and second reaction steps.

2. A method of achieving at least some of the benefits of effluent refrigeration for a first chemical reaction system involving the alkylation of an alkylatable hydrocarbon wherein the reactants are contacted in liquid phase in a reaction step, one of the reactants is in excess, relatively volatile, and capable of being evaporated with pressure reduction, and wherein it is desirable to cool said reaction step and a mixture is withdrawn as effluent from said reaction step, said first chemical reaction system being refrigerated by means other than effluent refrigeration to cool the reaction step comprising the steps of reacting said first chemical reaction system and a second like chemical reaction system employing effluent refrigeration to cool its reaction step in separate reaction steps, discharging effluent reaction mixtures from said first and second chemical reaction steps, reducing pressure on said effluent mixtures to vaporize excess reactant in said effluent mixtures, passing at least the major portions of the combined reduced pressure effluent mixtures in indirect heat exchange with the second reaction mixture in its reaction step, passing said heat exchanged effluent mixtures to a separating step, separating said reduced pressure reaction mixtures into liquid and vapor components, the vapor component separated from said reduced pressure reaction mixtures being condensed and recycled as part of the feed to both of said first and second reaction steps.

3. A method as in claim 2 wherein after the vapor component separated from said reduced pressure reaction mixtures is condensed, a portion is reevaporated from the condensed body of liquid to reduce the temperature thereof prior to recycling as part of the feed to both said first and second reaction steps.

4. A method as in claim 2 wherein at least a portion of the liquid component separated from said reduced pressure reaction mixtures returned to cool the second reaction mixture is brought into indirect heat exchange with the feed of reactants to said first and second reaction steps.

5. A method as in claim 1 wherein all of said reduced pressure reaction mixtures are passed in heat exchanging relationship with the reaction step in said second chemical reaction system.

6. A method as in claim 2 wherein all of said reduced pressure reaction mixtures are passed in heat exchanging relationship with the reaction step in said second chemical reaction system.

References Cited in the file of this patent

UNITED STATES PATENTS

| | | |
|---|---|---|
| 2,123,021 | Phillips | July 5, 1938 |
| 2,238,802 | Altshuler et al. | Apr. 15, 1941 |
| 2,418,146 | Upham | Apr. 1, 1947 |
| 2,471,211 | Hadden | May 24, 1949 |
| 2,664,452 | Putney | Dec. 20, 1953 |